Figure 1:
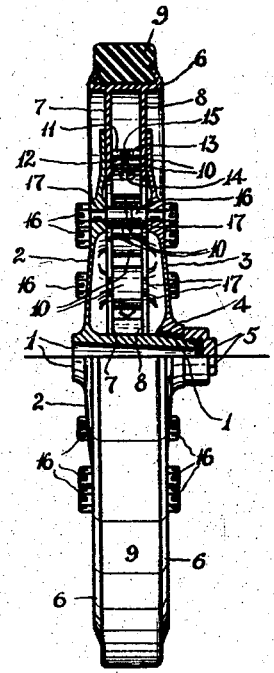

May 31, 1927.

G. C. GREEN 1,630,937

SPRING WHEEL FOR ROAD VEHICLES

Filed Dec. 11, 1925

Witness:
Arthur Thompson

Inventor:
George Charles Green

Patented May 31, 1927.

1,630,937

UNITED STATES PATENT OFFICE.

GEORGE CHARLES GREEN, OF JOHANNESBURG, TRANSVAAL, SOUTH AFRICA.

SPRING WHEEL FOR ROAD VEHICLES.

Application filed December 11, 1925, Serial No. 74,810, and in Union of South Africa September 25, 1925.

This invention has reference to elastic, resilient or spring wheels applicable for use with all kinds of road vehicles and especially motor cars and similar vehicles.

The object of the invention is to construct a wheel of the nature referred to which can be used in place of pneumatic-tyred wheels or other resilient rubber-tyred and similar wheels. By the use of wheels constructed according to the invention, the trouble that ensues with pneumatic tyres, owing to their becoming deflated, is obviated.

My improved elastic or resilient wheel is of simple design, inexpensive to construct and efficient in use.

The invention will be described in detail in connection with the accompanying drawings, wherein I illustrate a practical embodiment of the same. In the drawings, Fig. 1 is a half-sectional front elevation of the improved wheel, and Fig. 2 is a half-sectional side elevation of the same.

The wheel structure is shown including the hub portion or centre piece 1 of any suitable design or construction to adapt the wheel to the axle of any particular vehicle. The hub 1 is shown constructed integral with a disc portion 2 fashioned at or near one end of said hub 1; 3 being a similar disc detachably secured at or near the other end of the hub portion 1 by means of a key or its equivalent 4 and additionally retained in position by the nut or axle cap 5.

Figure 2:
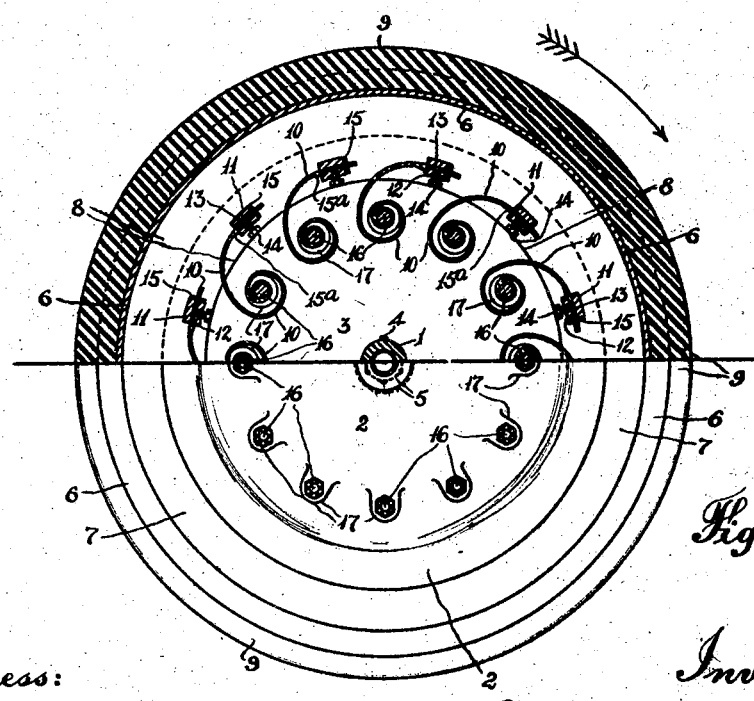

Around the outer portions of the discs 2, 3, there is arranged a rim or tyre-carrying portion 6, which is fashioned internally with two inwardly directed parallel annular flanges 7, 8, which, as shown in the sectional half of Fig. 1, project between, and are adapted to work in the space or guideway provided by and between the outer parallel portions of the discs 2, 3.

9 represents a rubber or other suitable tyre appropriately secured around the rim portion 6.

The rim portion 6 and the flanges 7, 8, which are shown constructed integral therewith, are resiliently connected to the discs 2, 3, and through the latter to the hub 1, by means of a suitable number of C or coiled metal springs 10, one end of each of which is attached to the flanges 7, 8, and the other to the discs 2, 3. The means shown for attaching the ends of the springs 10 to the flanges 7, 8, consists of cross pieces 11, 12, formed on the flanges and extending between them, and providing between them spaces or openings 13 in which the ends of the springs 10 are secured by means of the set screws 14. The end of each spring may be further secured, if desired, by means of a pin 15 placed in a hole in the end of the spring and engaging with the cross-pieces 11, 12,—see Fig. 2. A projection or thickened portion 15ª of the spring 10 may be provided to serve as a stop to engage the cross-pieces 11, 12, at the opposite side to the pin 15.

The other and inner ends of the coiled springs 10 are shown secured in position between the discs 2, 3, by means of the bolts 16 which serve as distance pieces between said discs 2, 3, and as means for connecting the same. As indicated at 17, the discs 2, 3, may be constructed with bosses or thickened at the points where the holes are formed for the reception of the bolts 16. As represented in Fig. 2, the bolts are disposed in a circle symmetrically around the hub 1.

The normal direction of rotation of the wheel is indicated by the arrow in Fig. 2 and, as shown in the said figure the points of attachment of the outer ends of the springs 10 are in advance of the points of attachment of the other and inner ends of said springs. This construction does not preclude the wheel rotating in the reverse direction when the vehicle is being moved backwards.

From a consideration of the drawings it will be understood that the rim portion 6 with the attached flanges 7, 8, is able to move in the guideway provided between the outer portions of the discs 2, 3, against the resilient action of the springs 10.

What I claim as my invention and desire to protect by Letters Patent is:—

A spring wheel for road vehicles, comprising a rim portion which carries the tyre and is constructed internally with two parallel inwardly directed annular flanges, cross-pieces connecting said flanges, a hub portion, discs connected to said hub portion between which the parallel inwardly directed flanges work and are guided, and coiled springs one end of each of which is attached to certain of the cross-pieces and the other to the discs, the means for attaching each spring to the cross-pieces including a set-screw, a pin passing through the spring and a stop provided on the spring, as set forth.

In testimony whereof I have signed my name to this specification.

GEORGE CHARLES GREEN.